(12) United States Patent  
Uno

(10) Patent No.: US 7,640,366 B2  
(45) Date of Patent: Dec. 29, 2009

(54) STORAGE CONTROLLER TO CONTROL ACCESS TO STORAGE DEVICE VIA SERIAL COMMUNICATION UNIT BY EXECUTING CONTROL STEP UNITS

(75) Inventor: Fumitoshi Uno, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 433 days.

(21) Appl. No.: 11/619,890

(22) Filed: Jan. 4, 2007

(65) Prior Publication Data

US 2007/0156959 A1 Jul. 5, 2007

(30) Foreign Application Priority Data

Jan. 5, 2006 (JP) .............................. 2006-000885

(51) Int. Cl.
*G06F 12/00* (2006.01)

(52) U.S. Cl. ................................ 710/5; 710/13; 710/14; 710/313; 711/5; 711/103; 711/115; 711/154

(58) Field of Classification Search ..................... 710/5, 710/13, 14, 313; 711/5, 103, 115, 154
See application file for complete search history.

(56) References Cited

U.S. PATENT DOCUMENTS 7,526,580 B2 * 4/2009 Uno ............................ 710/14
2005/0023339 A1 2/2005 Uno

FOREIGN PATENT DOCUMENTS

JP 2005-107875 A 4/2005

* cited by examiner

*Primary Examiner*—Hong Kim
(74) *Attorney, Agent, or Firm*—Baker Botts L.L.P.

(57) ABSTRACT

A storage controller includes a CPU for controlling each component in the storage controller; a ROM for storing programs executed by the CPU and data required for this execution; a RAM employed as a work area when the CPU executes the programs; a first ASIC (USB system) for controlling data transfers based on the USB standard; slots in which can be inserted various external memory units; a second ASIC (external memory system) for controlling data accesses to the external memory units to read data therefrom or write data thereto; and an address bus and a data bus connecting these components to one another.

8 Claims, 12 Drawing Sheets

FIG.13
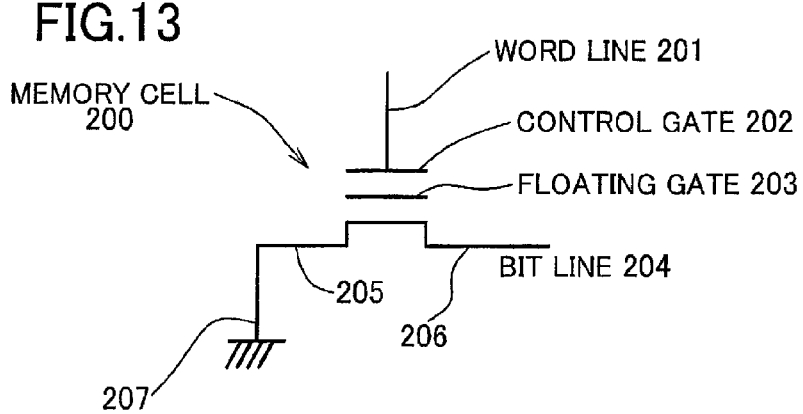
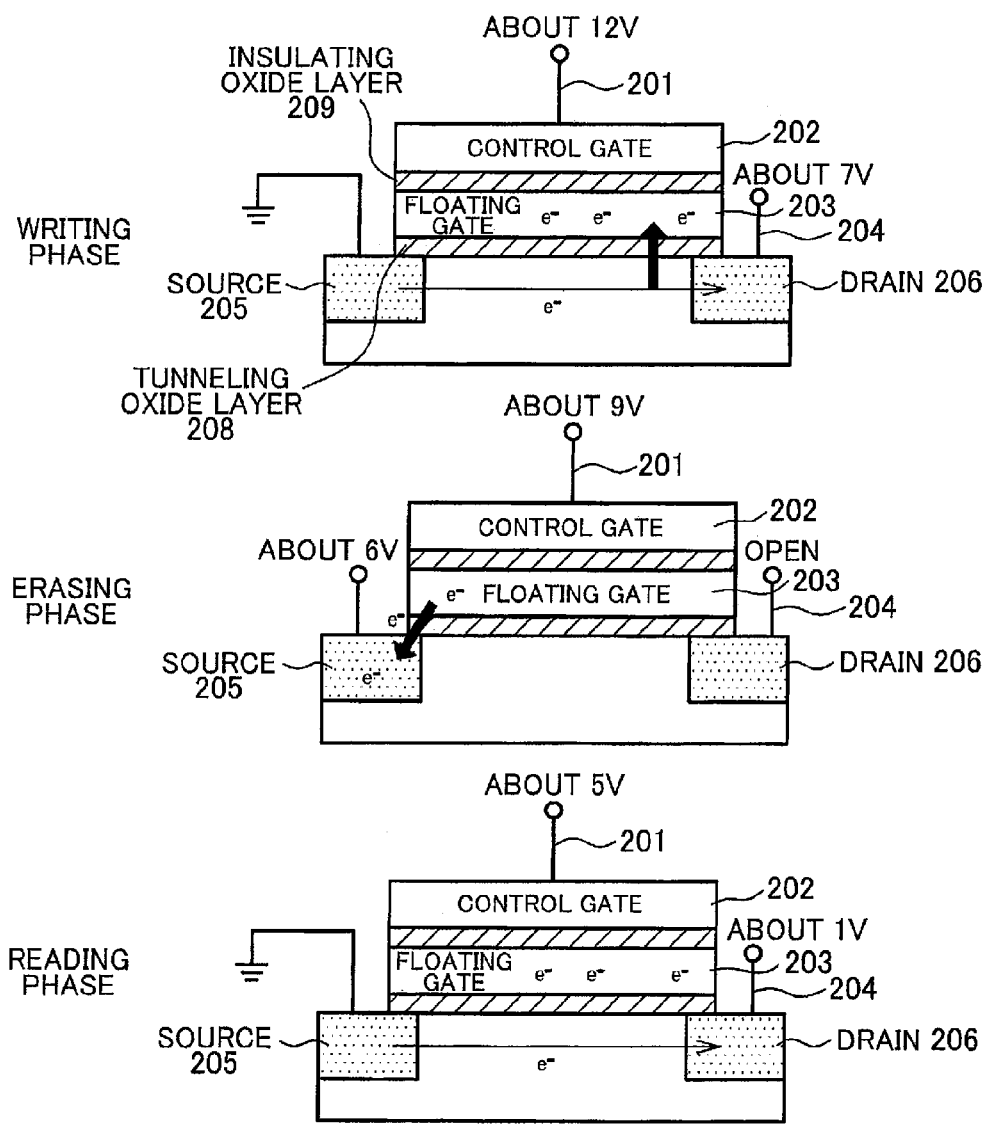

STORAGE CONTROLLER TO CONTROL ACCESS TO STORAGE DEVICE VIA SERIAL COMMUNICATION UNIT BY EXECUTING CONTROL STEP UNITS

CROSS REFERENCE TO RELATED APPLICATIONS

This application claims priority from Japanese Patent Application No. 2006-000885 filed Jan. 5, 2006. The entire content of the priority application is incorporated herein by reference.

TECHNICAL FIELD

The present invention relates to a storage controller, and more particularly to a multi-slot storage controller having a plurality of slots in which various types of storage media can be mounted.

BACKGROUND

Conventional storage controllers having a plurality of built-in or mountable storage media such as flash memory have become widespread in use. A personal computer or other host device can access the storage media to read and write data. The storage controller includes a plurality of slots in which various types of storage media can be mounted. Examples of this storage media include CompactFlash®, SmartMedia® Memory Stick®, and Secure Digital (SD) Cards®, which are card-type storage media provided with flash memory. Conventional multi-slot storage controllers allow the mounted storage media to be read from or written to.

While the volume of data transmissions has increased dramatically due to the popularity of multimedia, data transmission between these storage controllers and personal computers has generally been implemented through serial communication. However, in order to facilitate the handling of a plurality of storage media, there now exist many devices that assume the role of an arbitration/access control system fox controlling data accesses with peripherals using parallel communication.

The system may employ an access control device such as the following. The access control device controls data accesses to storage devices in a control step unit in which the following steps are sequentially executed: a primary control command analyzing step for receiving from a personal computer and analyzing a primary control command identifying the content of the data access; a data access step for accessing a storage device according to the analyzed content of the primary control command; and a status transmitting step for transmitting a status indicating the results of the data access to the host device.

Specifically, when the personal computer issues a command specifying the type of access (such as read, write, erase, and confirm the presence of media), the access control device executes a series of operations (control step unit) as a set. This series of operations includes analyzing the content of the command, executing the corresponding access control, and returning to the personal computer a status indicating the results of the access after completing the access control. When the control device is executing a control step unit for a current data access, a control step unit for a succeeding data access is queued until execution of the current control step unit is completed. This is a common method corresponding to the SCSI (Small Computer System Interface) standard.

The USB (Universal Serial Bus) standard has been in widespread use in recent years as a serial communication method for connecting with peripheral devices. Data transfers according to the USB standard are performed by specifying a communication destination (target) among a plurality of peripherals connected to the personal computer through polling. A storage controller configured of a USB device can implement data accesses such as reading and erasing data through serial communication. If the storage controller configured as a USB peripheral incorporates an access control device using the SCSI system described above, the personal computer uses polling to target this access control device and perform serial communications therewith (hereinafter, this type of storage controller will be referred to as a USB/SCSI storage controller).

Multi-slot type storage controllers configured as the USB/SCSI storage controller described above have conventionally employed a hardware structure having a plurality of slots for mounting storage media separately, which slots are collectively connected to a single access control device, as disclosed in Japanese Patent Application Publication No. 2005-107875.

However, the conventional configuration includes a single access control device that can be polled as a target for serial communication. Hence, as described above, while a control step unit is being executed for a current data access, a control step unit for a succeeding data access is queued until the current control step unit has been completed. Therefore, when there are competing data accesses from the PC to the plurality of slots connected to the single access control device, the control step unit for each data access must be processed sequentially, even when the these data accesses target different slots. In other words, when a control step unit is being performed for a certain slot, a control step unit for another slot cannot be executed until the control step unit for the current slot has been completed even during idle time in which no actual read/write accesses are being performed, such as when analyzing the command. This idle time becomes dead time, resulting in extremely poor control efficiency. This problem is particularly striking when the storage media is flash memory or the like having a slow read/write speed.

SUMMARY

In view of the foregoing, it is an object of the present invention to provide a storage controller having a plurality of built-in or mountable storage media capable of achieving fast data accesses by reducing the likelihood of unneeded access wait times for each storage medium when access conflicts occur among the plurality of storage media.

The above and other objects are attained by a storage controller that includes a plurality of storage devices having built-in or mountable storage media and capable of accessing data in such storage media, the storage media having data that can be accessed by a host device at least for a read access; access control devices that are functionally independent and provided for each storage device, each access control device functioning (1) to control data accesses to the storage devices by control step units in which are sequentially executed a primary control command analyzing step for receiving from the host device and analyzing primary control commands specifying the content of the data access, a data access step for performing a data access with the storage device corresponding to the analyzed content of the primary control command, and a status transmitting step for transmitting to the host device a status indicating the results of the data access, and (2)

to queue the execution of a control step unit for a chronologically succeeding data access while a control step unit for a preceding data access is being executed until execution of the current control step unit has completed; and a serial communication unit for performing access-related data transfers between the host device and the access control device specified by the host device in order to execute the control step units, the access-related data including at least the primary control command and the status from among the primary control command, data, and status as transfer elements, using serial communications according to a format of polling the access control devices and for performing a process to transfer a set of transfer elements including the access-related data for control step units targeting different access control devices according to a format that allows the transfer elements in the set to be mixed chronologically.

With this construction, by functioning independently for each storage device, the access control devices can execute a control step unit independently for each storage device, without placing a control step unit for another storage device on standby. Accordingly, the serial communication unit can transfer sets of transfer elements constituting access-related data for control step units of different targeted access control devices according to a format that allows transfer elements within the sets to be mixed chronologically. As a result, a host device can access data in these storage media rapidly.

With the storage controller of the present invention, storage media, which a host device can write data to and read or erase data from, are detachably mounted in the storage devices. The storage media can be configured of a nonvolatile memory capable of storing electrically rewritable storage content and preserving the storage content, even when an external reset signal is received. Each storage medium has a storage area that is divided into a plurality of rewritable unit blocks, whereby the storage content of the storage medium can be erased and rewritten only in units of rewritable unit blocks.

More specifically, the access control devices include transfer element transmission/reception units for exchanging transfer elements with the serial communication unit, and a primary control implementation body for interpreting a primary control command included in the transfer elements and performing a data access on a storage device based on the content of the primary control command. A plurality of the transfer element transmission/reception units is provided in a one-on-one correspondence to the storage devices. The primary control implementation body places the transmission and reception of transfer elements constituting the access-related data on standby for a succeeding control step unit until the series of transfer elements constituting the access-related data for a preceding control step unit has been transferred when the transfer elements are exchanged with a transfer element transmission/reception unit corresponding to the same storage device. However, the primary control implementation body uses intervals between processes for transmitting and receiving transfer elements associated with a control step unit for one storage device to perform transmission and reception processes for transfer elements belonging to another control step unit when the transfer elements are exchanged with transfer element transmission/reception units corresponding to different storage devices, thereby enabling parallel processing when executing control step units for different storage devices.

The storage controller of the present invention can be configured with a single primary control implementation body that is shared by a plurality of the transfer element transmission/reception units.

In the storage controller of the present invention, the plurality of transfer element transmission/reception units and the serial communication unit can be integrated in a special integrated circuit.

In the storage controller according to the present invention, the serial communication unit comprises a communication bus connection terminal for connecting to a serial communication bus from the host device, and a communication control unit for executing processes to exchange transfer elements between the serial communication bus and the transfer element transmission/reception units. The communication control unit comprises a communication protocol engine connected to the communication bus connection terminal, and a control command unit connected to the protocol engine via bi-directional control endpoints configured of FIFO memory for controlling the communication processes. The plurality of transfer element transmission/reception units can be connected to the protocol engine via an input endpoint and an output endpoint configured of FIFO memory for separating the input and output paths. Further, the communication control unit can identify the storage device targeted for data access and the direction of data transmission and reception by receiving identification data from the host device identifying the transfer element transmission/reception unit targeted for data access and the endpoint corresponding to the transfer element transmission/reception unit and by polling the transfer element transmission/reception unit as the target device.

In this case, the plurality of transfer element transmission/reception units can share a single communication controller and can be connected in parallel to a single protocol engine of the communication controller through independent sets of input and output endpoints.

In contrast to the above description, it is also possible to provided a plurality of independent communication control units corresponding to the plurality of transfer element transmission/reception units. In this case, each transfer element transmission/reception unit is connected to a corresponding communication control unit via a set of input and output endpoints, while the protocol engine of each communication control unit can be collectively connected to a single communication bus connection terminal via a hub circuit.

BRIEF DESCRIPTION OF THE DRAWINGS

Illustrative aspects in accordance with the invention will be described in detail with reference to the following figures wherein:

FIG. 13 is an explanatory diagram illustrating the structure and operating principles of a memory cell in flash memory.

DETAILED DESCRIPTION

Next, preferred embodiments of the present invention will be described while referring to the accompanying drawings.

First Embodiment

Figure 1:
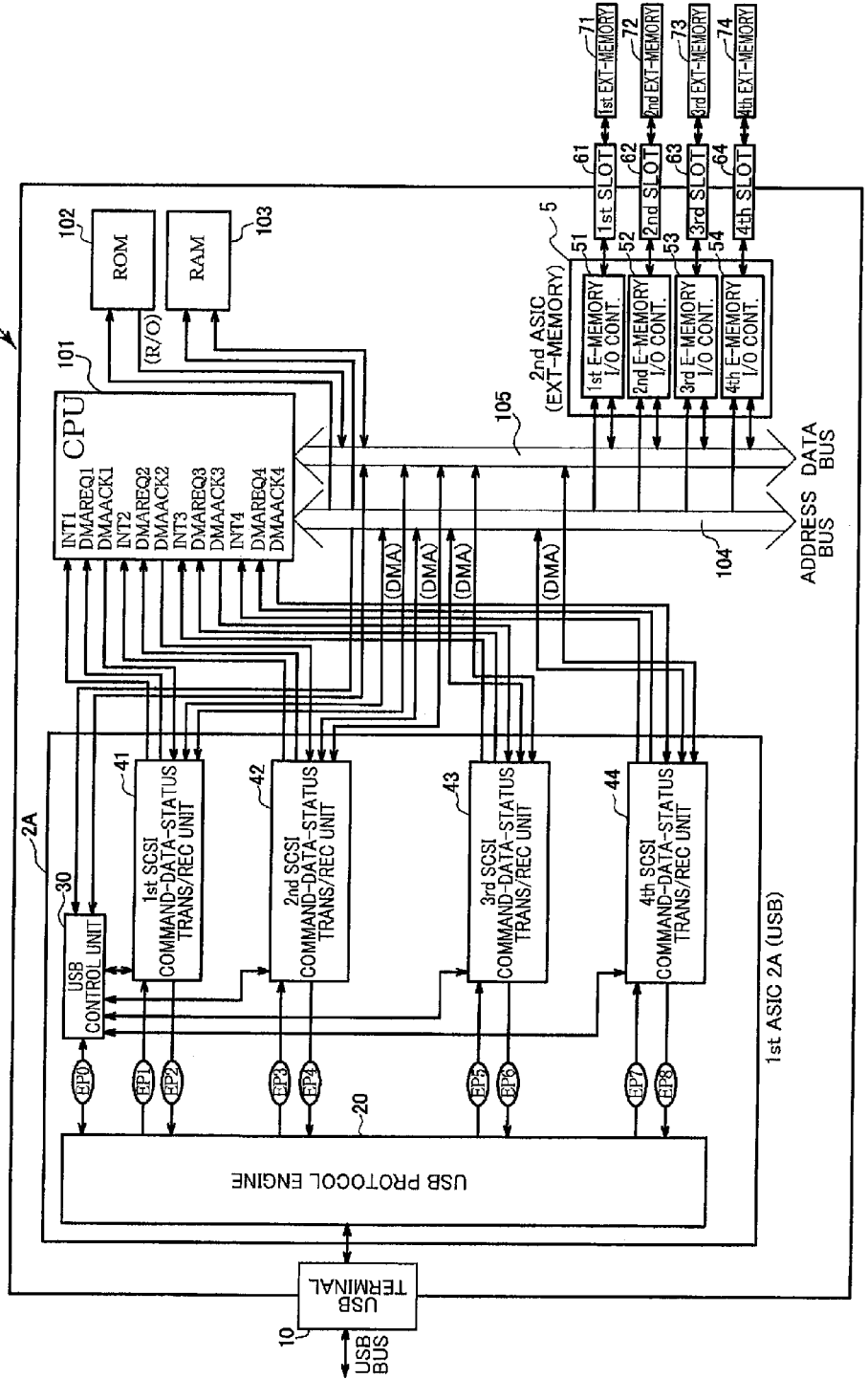
FIG. 1 is a block diagram showing the electrical structure of a storage controller according to a first embodiment.

FIG. 1 is a block diagram showing the electrical structure of a storage controller 1A according to a first embodiment. The storage controller 1A includes a CPU 101 for controlling each component in the storage controller 1A; a ROM 102 for storing programs executed by the CPU 101 and data required for this execution; a RAM 103 employed as a work area when the CPU 101 executes the programs; a first ASIC (USB system) 2A for controlling data transfers based on the USB standard; slots 61-64 in which can be inserted various external memory units 71-74; a second ASIC (external memory system) 5 for controlling data accesses to the external memory units 71-74 to read data therefrom or write data thereto; and an address bus 104 and a data bus 105 connecting these components to one another.

The second ASIC 5 includes external memory input/output controllers 51-54 for accessing data in the external memory units 71-74 inserted in the slots 61-64, respectively. Here, the external memory units 71-74 that are detachably mounted in the slots 61-64 are card-like storage media having flash memory accessible from a personal computer, such as CompactFlash®, SmartMedia®, Memory Stick®, and SD Cards®. The PC can write, overwrite, erase, and read data from this flash memory and can confirm whether the media is mounted in the slots. The storage controller 1A may also include a drive for reading data from a read only storage medium, such as a CD-ROM or a DVD-ROM, and a drive capable of performing reading, writing, and other accesses on a built-in hard disk.

The flash memory includes a plurality of primary memory blocks (each being at least one kilobyte and no more than 100 kilobytes in size, for example) configured of a group of memory cells storing values that can be switched between "1" and "0". In an erase mode, a deletion process can only be performed according to a format of setting all memory cells in a primary memory block 5f to "1". In a write mode, it is possible to perform a process to change any memory cell in a primary memory block from "1" to "0", but not from "0" to "1".

FIG. 13 conceptually illustrates the structure and operating principles for a memory cell in flash memory. As shown in FIG. 13, a memory cell 200 has a MOS transistor structure. Specifically, a floating gate 203 and a control gate 202 are formed in layers on a silicon substrate via a thin tunneling oxide layer 208. An insulating oxide layer 209 that is thinner than the tunneling oxide layer 208 is interposed between the floating gate 203 and control gate 202, and an insulating material is formed around the periphery of the floating gate 203.

When writing to the memory cell 200, a control voltage of about +12 V, for example, is applied to the control gate 202 through a word line 201, and a bias voltage of about +7 V, for example, relative to a grounded source 205 is applied to a drain 206. These voltages produce a charge transfer between the source and drain, resulting in a tunneling effect by which electrons are injected into the floating gate 203 across the tunneling oxide layer 208. When reading data from the memory cell 200, a control voltage of about +5 V, for example, lower than the right control voltage, is applied to the control gate 202, and a bias voltage of about +1 V is applied to a bit line 204 connected to the drain 206. If an electric charge is injected into the floating gate 203, an electric field produced by this charge opens a channel between the source and drain through which current flows, at which time the input of the bit line 204 has a low impedance (it is common to define the storage value in this case as "0"). On the other hand, if an electric charge is not injected into the floating gate 203, then the channel remains closed, blocking the electric current between the source and drain, at which time the input of the bit line 204 has a high impedance (it is common to define the storage value in this case as "1"). Since the charge injected state of the floating gate 203, which is surrounded by an insulating material, is preserved, even when the voltage applied to the control gate 202 is 0. Accordingly, the memory cell 200 can preserve this storage state.

On the other hand, an erasure process is performed by applying an electric field gradient to the tunneling oxide layer 208 in the opposite direction of that applied during writing in order to draw out the electric charge from the floating gate 203 to the source 205 side. Since residual charge in the floating gate 203 is directly linked to data errors, an erasure control voltage of about −9 V, the opposite polarity of that applied during writing, is applied to the control gate 202, while a bias voltage of about +6 V, the opposite polarity to the control gate 202 side, is applied to the source 205 in order to reliably draw out the electric charge.

Since the source 205 is grounded during a writing operation, it is necessary to switch the connection from ground to a power supply during an erasure operation. If the memory cell 200 could be switched to an erasure power supply independently for each memory cell 200, erasure could be performed in bit units as in writing. However, such a construction would require that the source 205 of each memory cell 200 be isolated on the substrate. Further, additional wiring would be required to switch between the erasure power supply and ground, thereby greatly increasing the amount of area on the substrate occupied by each memory cell 200, which is clearly disadvantageous for increasing circuit density. Hence, in order to increase the storage capacity of flash memory, a plurality of the memory cells 200 within a range no less than 1 kilobyte and no greater than 100 kilobytes is grouped in a block (a primary memory block 5f in the present invention) having a common connection to all sources 205 in the block. With this construction, all memory cells 200 in the block are switched together between a ground 207 and an erasure power supply 308. Consequently, flash memory can only be erased in units of primary memory block 5f. It is still possible to inject an electric charge in the floating gate 203 (i.e., switch the storage value from "1" to "0") by individual memory cells (bits), but the electric charges can only be drawn out from the floating gates 203 in block units when erasing stored data. Hence, when writing data through a combination of bit unit processes, this construction allows stored values to be changed only from "1" to "0" and not from "0" to "1" As is clear from this principle, rewriting data involves a two-stage process of first erasing a block of data and subsequently writing the new data (in other words, it is not possible to simply overwrite all data as in RAM).

As shown in FIG. 1, the first ASIC 2A is integrally provided with SCSI command-data-status transmission/reception units (hereinafter simply called "transmission/reception units") 41-44 provided for each of the external memory input/output controllers 51-54; a USB protocol engine 20 connected to a USB terminal 10; and a USB protocol unit 30 for controlling transfer processes.

Here, the section including the USB protocol engine 20 and USB protocol unit 30 corresponds to the communication control unit in the claims, and the section including this communication control unit and the USB terminal 10 corresponds to the serial communication unit in the claims.

The USB protocol unit 30 is connected to the USB protocol engine 20 via a bi-directional endpoint configured of FIFO memory. Further, the transmission/reception units 41-44 are connected to the USB protocol engine 20 by separate input/output paths including input endpoints to the USB protocol engine 20 configured of FIFO memory and output endpoints from the USB protocol engine 20 configured of FIFO memory.

The communication control unit configured of the USB protocol engine 20 and USB protocol unit 30 receives specification data for the target transmission/reception unit 41-44 and specification data of the endpoint corresponding to the transmission/reception unit 41-44 from the personal computer and specifies the external memory input/output controller 51-54 targeted for data access and the direction of data transmission/reception by polling the transmission/reception unit 41-44 as a target, device.

In this way, a plurality of the transmission/reception units 41-44 share the single USE protocol engine 20 so that the transmission/reception units 41-44 are connected in parallel to the USB protocol engine 20 via independent sets of input endpoints and output endpoints.

The transmission/reception units 41-44 transmit transfer elements to and receive transfer elements from the USB protocol engine 20. Here, transfer elements specify a SCSI command identifying the content of the data access, SCSI data accompanying the data access specified in the SCSI command, and a SCSI status indicating the results of the data access that are exchanged with the personal computer via a USB bus.

Figure 3:
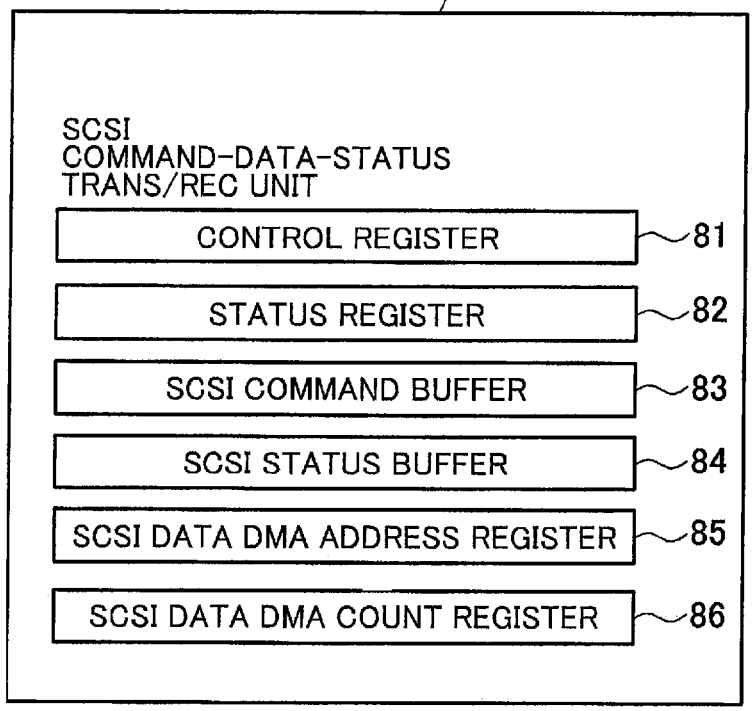
FIG. 3 is an explanatory diagram showing the structure of a SCSI command-data-status transmission/reception unit.
Figure 4:
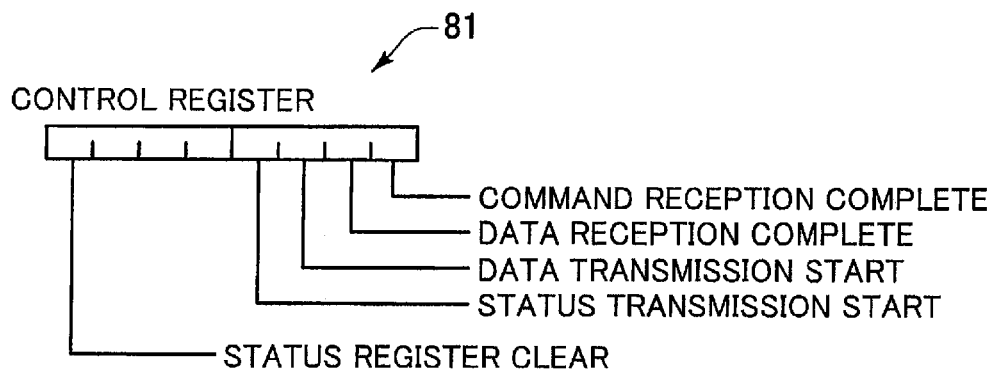
FIG. 4 is an explanatory diagram showing the structure of a control register.
Figure 5:
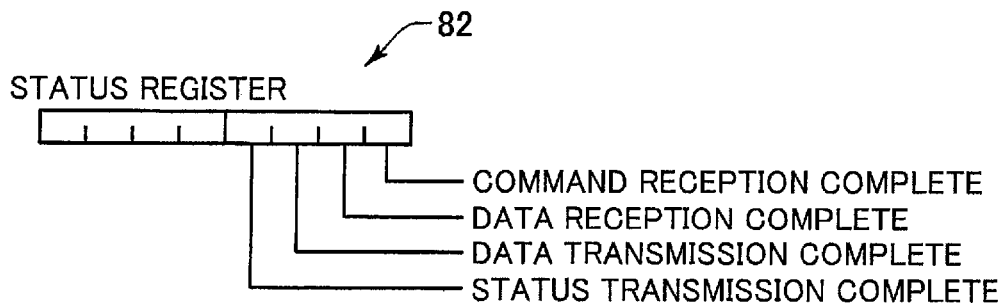
FIG. 5 is an explanatory diagram showing the structure of a status register.

As shown in FIG. 3, each of the transmission/reception units 41-44 includes a control register 81 (see FIG. 4), a status register 82 (see FIG. 5), a SCSI command buffer 83, a SCSI status buffer 84, a SCSI data DMA address register 85, and a SCSI data DMA count register 86. These registers will be described in greater detail below.

The CPU 101 sequentially executes a primary control command analyzing step for analyzing the SCSI command received from the target transmission/reception unit 41-44, a data access step for performing the data access identified in the SCSI command with the target external memory input/output controller 51-54, and a status transmission step for transmitting a SCSI status indicating the results of the data access to the transmission/reception unit 41-44. A control step unit is a process unit in which the primary control command analyzing step, the data access step, and the status transmission step are sequentially executed, and the CPU 101 controls data accesses by these process units.

Further, while performing processes in a preceding control step unit for one of the external memory input/output controllers 51-54, the CPU 101 queues succeeding control step units for the same control unit. On the other hand, the CPU 101 executes processes in a control step unit for a different external memory input/output controller 51-54 by executing an interrupt process during intervals between processes in the control step unit for the current external memory input/output controller 51-54. Accordingly, control step units for different external memory input/output controllers 51-54 can be performed as parallel processes.

Access control devices of the present invention denote the section of the storage controller 1A including the transmission/reception units 41-44 and the CPU 101. Specifically, while the CPU 101 is shared by the plurality of transmission/reception units 41-44, the CPU 101 performs processes for the external memory input/output controllers 51-54 independently. Accordingly, the transmission/reception units 41-44 work cooperatively with the CPU 101 to configure four functionally independent access control devices corresponding to the external memory input/output controllers 51-54.

Figure 7:
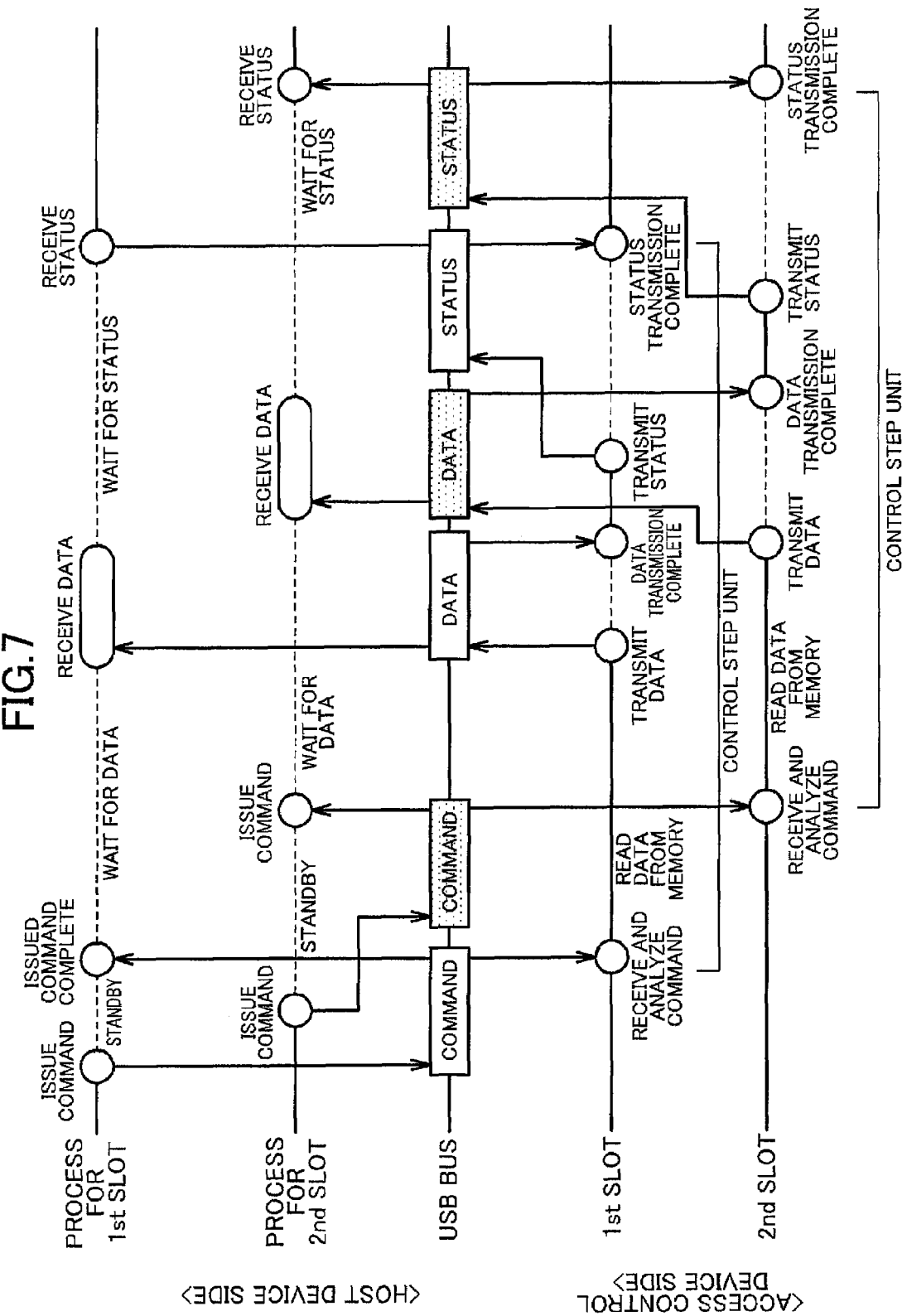
FIG. 7 is an explanatory diagram illustrating data accesses performed by the storage controller of the present invention.

Next, the operations of the storage controller 1A will be described. The storage controller 1A operates on power supplied from the personal computer via the USB cable (bus power). The personal computer can access data in each of the external memory units 71-74 inserted in the corresponding slots 61-64. FIG. 7 illustrates operations performed during data accesses. In the example of FIG. 7, the personal computer issues a SCSI command for reading data from the first slot 61, and immediately thereafter issues another SCSI command for reading data from the second slot 62.

First, just the operations for accessing the first slot 61 will be described. When the personal computer issues a SCSI command for reading data, the SCSI command is transferred as data along the USB bus and is transmitted to the targeted first transmission/reception unit 41 via the USB protocol engine 20. When the first transmission/reception unit 41 receives the SCSI command, the CPU 101 analyzes the command and controls the external memory input/output controller 51 to read data from the first external memory unit 71 inserted in the first slot 61. The CPU 101 transmits the data read by the external memory input/output controller 51. The CPU 101 transmits the SCSI data read by the external memory input/output controller 51 via the first transmission/reception unit 41 and along the USB bus to the personal computer. After completing this transfer, the CPU 101 transfers a SCSI status indicating the results of the data access from the first transmission/reception unit 41. This SCSI status is transferred to the personal computer along the USB bus as data.

Through this process, the CPU 101 completes a single control step unit for the first slot 61. While performing this single control step unit, transfer elements including the SCSI command, SCSI data, and SCSI status are transferred over the USB bus in the order given. This set of transfer elements will be referred to as access-related data (even when excluding SCSI data).

Here, the SCSI command, SCSI data, and SCSI status are transmitted over the USB bus. (Each of the command, data, and status, can be viewed as "data" in a broad sense, because all of them are configured of a combination of data bits. However, only data to be read from, written to, or erased from a storage device is referred to as "data" in the present invention to avoid confusion.) SCSI commands are transmitted from the personal computer to an access control device, while the SCSI status is transmitted from an access control device to the personal computer. Each SCSI command defines the existence, transfer direction, and size of the SCSI data, which can be obtained by interpreting the SCSI command.

Next, the relationship between the processes for the first and second slots 61 and 62 will be described. If the personal computer issues a SCSI command for reading data from the second slot 62 immediately after issuing a SCSI command for reading data from the first slot 61, the CPU 101 can perform processes in control step units for the different external memory input/output controllers 51 and 52 in parallel, as described above. In other words, the CPU 101 can perform processes in the control step unit for the second slot 62 while performing processes in the control step unit for the first slot 61. Therefore, the personal computer can transmit a SCSI command for the second slot 62 along the USB bus immediately after transmitting a SCSI command for the first slot 61, without waiting to receive the SCSI status related to accessing the first slot 61.

In this way, transfer elements (SCSI command, SCSI data, and SCSI status) transferred during a control step unit for the first slot 61 and during a control step unit for the second slot 62 over the USB bus can be mixed in chronological sequence. This method makes effective use of intervals in which transfer elements are not being transferred over the USB bus, enabling the personal computer to rapidly access data in the first external memory unit 71 inserted in the first slot 61 and the second external memory unit 72 inserted in the second slot 62. In particular, this method dramatically increases the processing efficiency in writing data to and erasing data from a plurality of the external memory units when the memory units are configured of flash memory or another media that requires more time for writing and erasing accesses.

Figure 10:
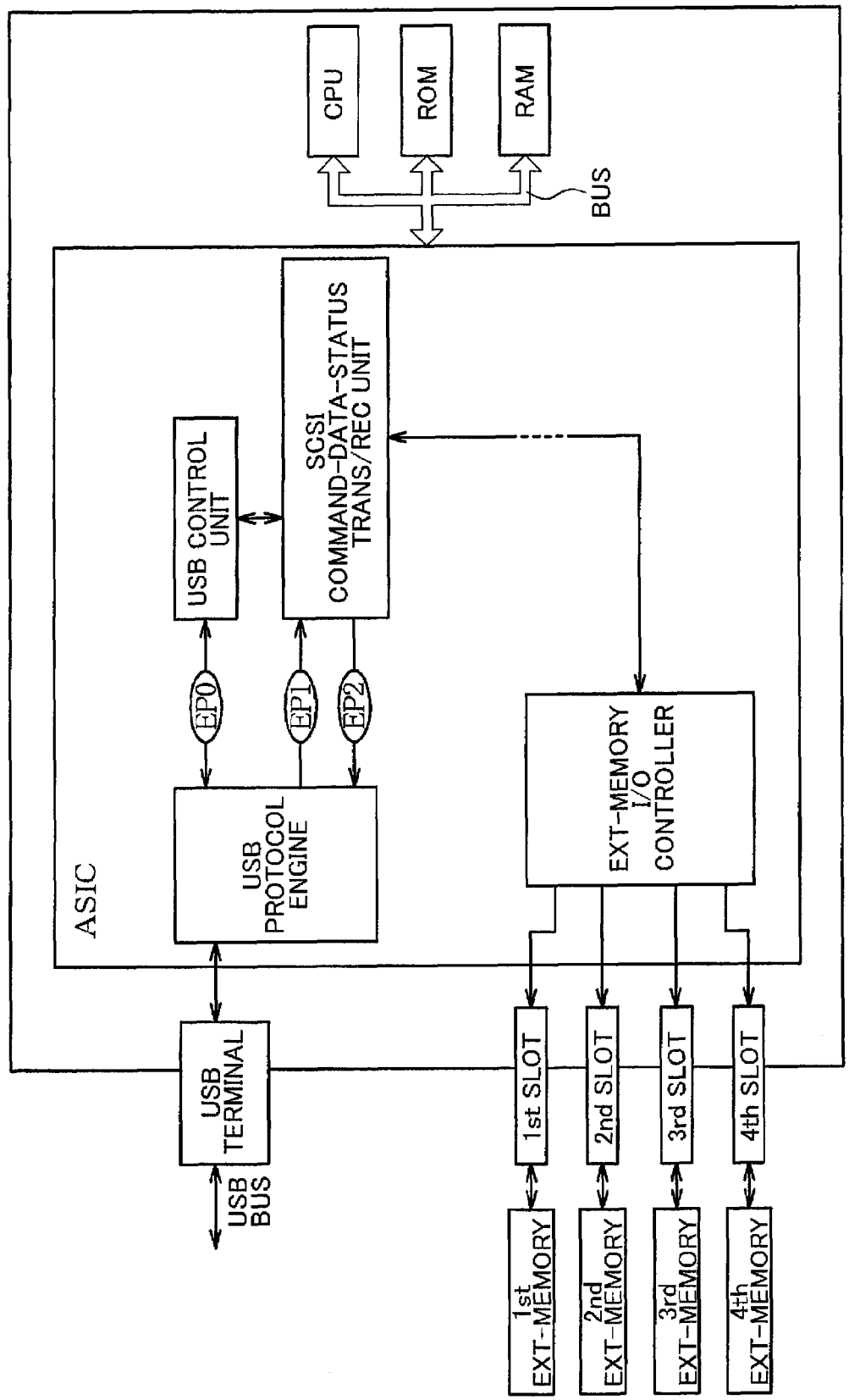
FIG. 10 is a block diagram showing the electrical structure of a conventional storage controller.

For reference, FIG. 10 shows an example structure of a conventional storage controller having a plurality of slots for mounting flash memory or other external memory units. This storage controller includes an external memory input/output controller (storage device) having a plurality of slots; a SCSI command-data-status transmission/reception unit for analyzing SCSI commands received from a personal computer, performing data accesses through the external memory input/output controller based on the SCSI command, and returning the status indicating the results of the data access to the personal computer; and a USB controller having a USB protocol engine and a USB control unit for transferring data related to these operations and the like between the transmission/reception unit serving as the target device and the personal computer.

Figure 11:
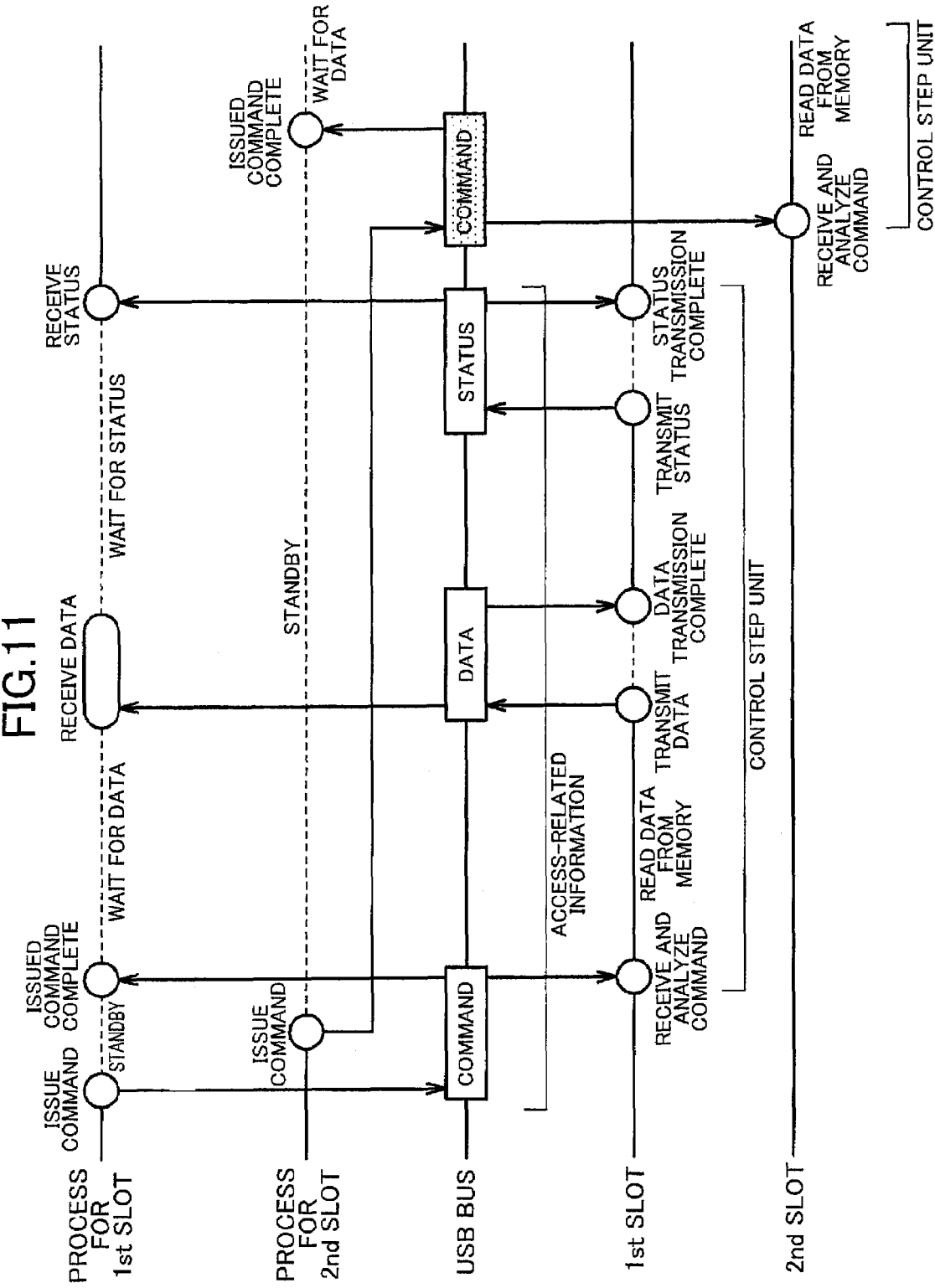
FIG. 11 is an explanatory diagram illustrating data accesses performed by the conventional storage controller.

However, the storage controller with this construction has the following problems. As shown in FIG. 11, the SCSI command-data-status transmission/reception unit performs as one unit the processes for analyzing the SCSI command received from the personal computer, executing a data access via the external memory input/output controller based on the analyzed command, and returning the status indicating the data access results to the personal computer. Accordingly, after receiving a command for the first slot, for example, this storage controller cannot receive a command for another slot until returning the status for the first slot. Therefore, if the personal computer issues a command for the second slot immediately after issuing a command for the first slot, the command for the second slot must be queued until the status for the previous slot is transmitted, even though the USB bus is free.

For example, if the personal computer issues a SCSI command to read data from the second slot immediately after issuing a SCSI command to read data from the first slot, the CPU cannot process the control step unit for the succeeding second slot while processing the control step unit for the preceding first slot. Hence, transfer elements (SCSI command, SCSI data, and SCSI status) associated with the control step unit for the second slot cannot be transmitted over the USB bus, even during intervals between transmitting transfer elements associated with the control step unit for the first slot, resulting in time loss. This is starkly different from the example of the present invention shown in FIG. 7 described above.

Figure 6:
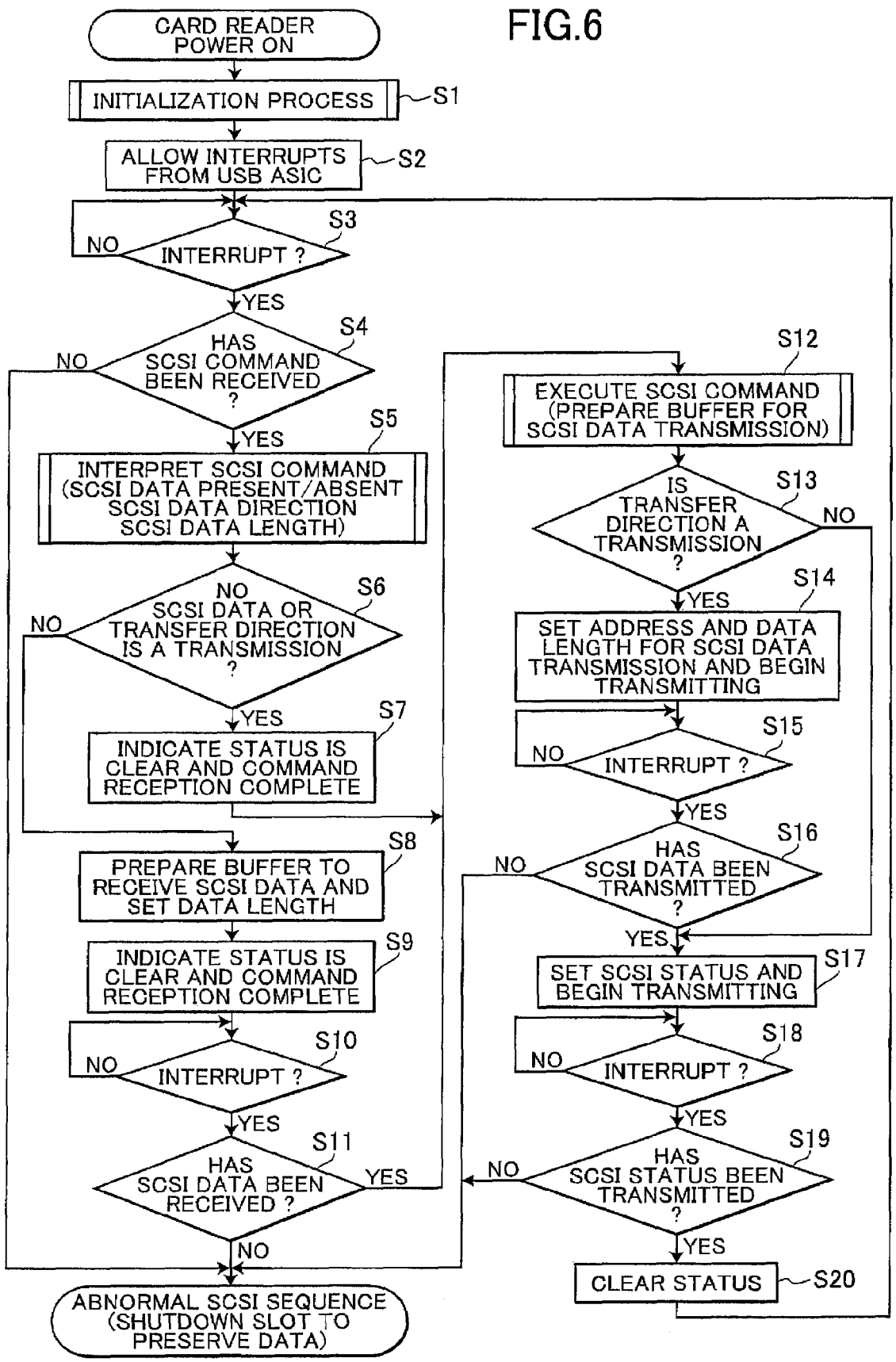
FIG. 6 is a flowchart illustrating steps in a process performed by the SCSI command-data-status transmission/reception unit.

Next, the operations of the storage controller 1A will be described in greater detail with reference to the flowchart in FIG. 6. The following description covers only the processes for one slot. Processes are performed for a plurality of slots in parallel using an interrupt process.

Upon the CPU 101 being turned on by power supplied from the personal computer via the USB cable (bus power), an initialization process is performed in S1. In S2 the CPU 101 enters a state for allowing interrupts from the first ASIC 2A. Through operations of the USB protocol engine 20 and USB protocol unit 30, the first. ASIC 2A functions to distribute SCSI commands transmitted from the personal computer across the USB bus to the target transmission/reception unit 41-44. At this time, the first ASIC 2A does not yet issue a response to the personal computer acknowledging receipt of the SCSI command.

Upon receiving the SCSI command, the transmission/reception unit 41-44 sets a "command reception complete" bit in the status register 82 to 1 and issues an interrupt to the CPU 101. In this case, the CPU 101 determines the reason for the interrupt by referencing the status register 82. Further, the received SCSI command is stored in the SCSI command buffer 83.

When an interrupt has been generated (S3: YES), then in S4 the CPU 101 determines whether the SCSI command has been received. If so (S4: YES), then in S5 the CPU 101 interprets the SCSI command received by the transmission/reception unit 41-44. Specifically, after referencing the status register 82 in the transmission/reception unit 41-44 and learning that the transmission/reception unit 41-44 has received a SCSI command, the CPU 101 acquires the SCSI command from the SCSI command buffer 83 and interprets the command. Accordingly, the CPU 101 learns of the existence, transfer direction, and size of the SCSI data.

When interpreting the SCSI command, if the CPU 101 determines that there is no SCSI data (in a Test Unit Ready command, for example) or that the transfer direction for the SCSI data is from the access control device to the personal computer (transmission; in a Read command, for example; S6: YES), then in S7 the CPU 101 writes a 1 to the "command reception complete" bit and the "status register clear" in the control register 81 of the transmission/reception unit 41-44.

As soon as the CPU 101 writes a 1 to the "command reception complete" bit in S7, the transmission/reception unit 41-44 issues a response to the personal computer indicating that the SCSI command was received. Upon receiving the response, the personal computer shifts to a standby state, since the next data received will be the SCSI status if there exists no SCSI data, or the SCSI data if the transmission direction for the SCSI data is from the access control device to the personal computer.

However, if the CPU 101 determines that the transmission direction of the SCSI data is from the personal computer to the access control device (reception) when interpreting the SCSI command (in a Write command, for example; S6: NO), then in S8 the CPU 101 prepares to receive SCSI data from the personal computer. More specifically, the CPU 101 allocates the required area on the RAM 103 for receiving the SCSI data, writes the top address to the SCSI data DMA address register 85, and writes the number of bytes to be received to the SCSI data DMA count register 86. Subsequently, in S9 the CPU 101 writes a 1 to the "command reception complete" bit and the "status register clear" bit in the control register 81 of the transmission/reception unit 41-44.

At the moment the CPU 101 writes a 1 to the "command reception complete" bit in S9, the transmission/reception unit 41-44 issues a response to the personal computer acknowledging receipt of the SCSI command. Upon receiving this response, the personal computer recognizes that the access control device has interpreted the SCSI command and has completed preparations for receiving the SCSI data. Therefore, the personal computer begins transmitting the SCSI data.

As soon as the value in the SCSI data DMA count register 86 reaches 0, the transmission/reception unit 41-44 sets the "data reception complete" bit in the status register 82 to 1 and issues an interrupt to the CPU.

When the interrupt is generated (S10: YES), the CPU 101 writes a 1 to the "data reception complete" bit and the "status register clear" bit in the control register 81 of the transmission/reception unit 41-44, thereby completing reception of the SCSI data (S11: YES). At this time, the personal computer receives notification that the SCSI data has reached the access control device and enters a standby state to receive the SCSI status.

After completing the process in S7 and after making a "YES" determination in S11, in S12 the CPU 101 executes the SCSI command. For example, if the SCSI command is a Test Unit Ready command, the CPU 101 determines whether the targeted external memory unit 71-74 is inserted. If the command is a Read command, the CPU 101 reads data from the external memory unit 71-74. If the command is a Write command, the CPU 101 writes the data received for this purpose from the personal computer (S8-S11 described above) to the external memory unit 71-74.

Next, if the transmission direction for the SCSI data is from the access control device to the personal computer (transmission; in a Read command, for example; S13: YES), then in S14 the CPU 101 prepares to transmit the data read in S12 to the personal computer. Specifically, the CPU 101 allocates an area in the RAM 103 required for transmission, stores the data read in S12 in the allocated area, writes the top address to the SCSI data DMA address register 85, and writes the number of data bytes to the SCSI data DMA count register 86. Subsequently, the CPU 101 writes a 1 to the "data transmission start" bit in the control register 81 of the transmission/reception unit 41-44.

At the moment the CPU 101 writes a 1 to the "data transmission start" bit in S14, the transmission/reception unit 41-44 begins transferring SCSI data to the personal computer. After completing the transfer of the SCSI data, the transmission/reception unit 41-44 sets the "data transmission complete" bit in the status register 82 to 1 and issues an interrupt to the CPU.

When the interrupt is generated (S15: YES), the CPU 101 determines that transmission of the SCSI data is complete. Accordingly, the CPU 101 writes a 1 to the "status register clear" bit in the control register 81 of the transmission/reception unit 41-44, thereby completing the SCSI data transmission (S16: YES).

When the CPU 101 makes a "NO" determination in S13 and when the CPU 101 makes a "YES" determination in S16, in S17 the CPU 101 begins transmitting the SCSI status. Specifically, the status to be returned to the personal computer has already been determined during the process described above. Accordingly, the CPU 101 writes this status to the SCSI status buffer 84, writes a 1 to the "status transmission start" bit in the control register 81 of the transmission/reception unit 41-44, and begins transmitting the SCSI status.

As soon as the CPU 101 writes a 1 in the "status transmission start" bit in S17, the transmission/reception unit 41-44 begins transmitting the SCSI status to the personal computer. When the transmission/reception unit 41-44 subsequently receives a response from the personal computer acknowledging receipt of the SCSI status, the transmission/reception unit 41-44 sets the "status transmission complete" bit in the status register 82 to 1 and issues an interrupt to the CPU.

When the interrupt is generated (S18: YES), the CPU 101 determines that transmission of the SCSI status is complete. Accordingly, the CPU 101 writes a 1 to the "status register clear" bit in the control register 81 of the transmission/reception unit 41-44, thereby completing the SCSI data transmission (S19: YES). Consequently, the status register 82 in the transmission/reception unit 41-44 is cleared, returning the transmission/reception unit 41-44 to its original state.

In the process described above, the SCSI data is transferred to the RAM 103, which is the main memory of the CPU 101, by DMA (direct memory access). However, the storage controller 1A may be provided with other memory for storing the SCSI data. Further, while the SCSI commands and SCSI status are stored in registers in the first ASIC 2A according to the process described above, this data may be sent according to a DMA transfer, as described for the SCSI data.

Figure 8:
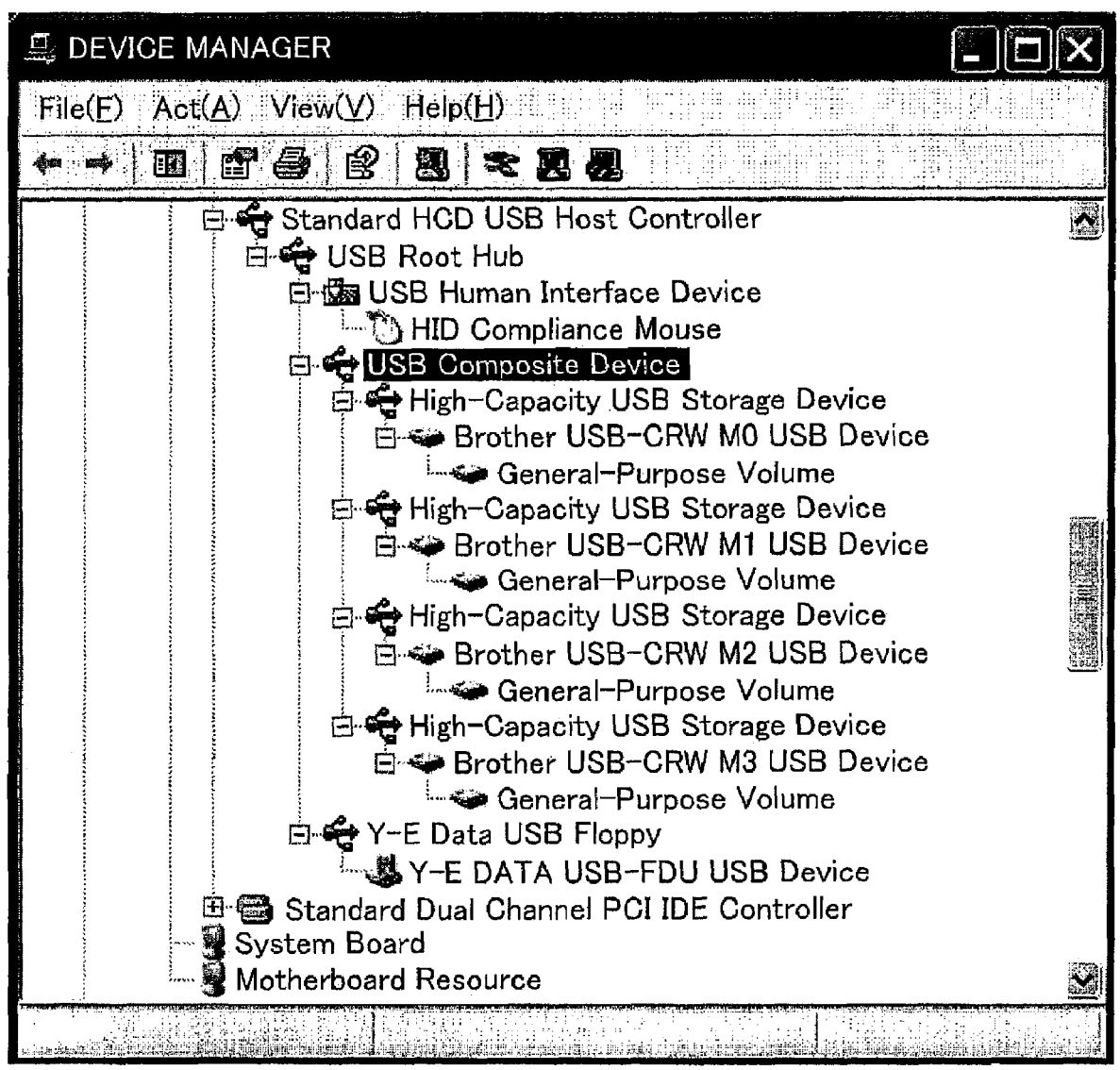
FIG. 8 is a screenshot on a host device side showing how the storage controller according to the first embodiment is recognized.
Figure 12:
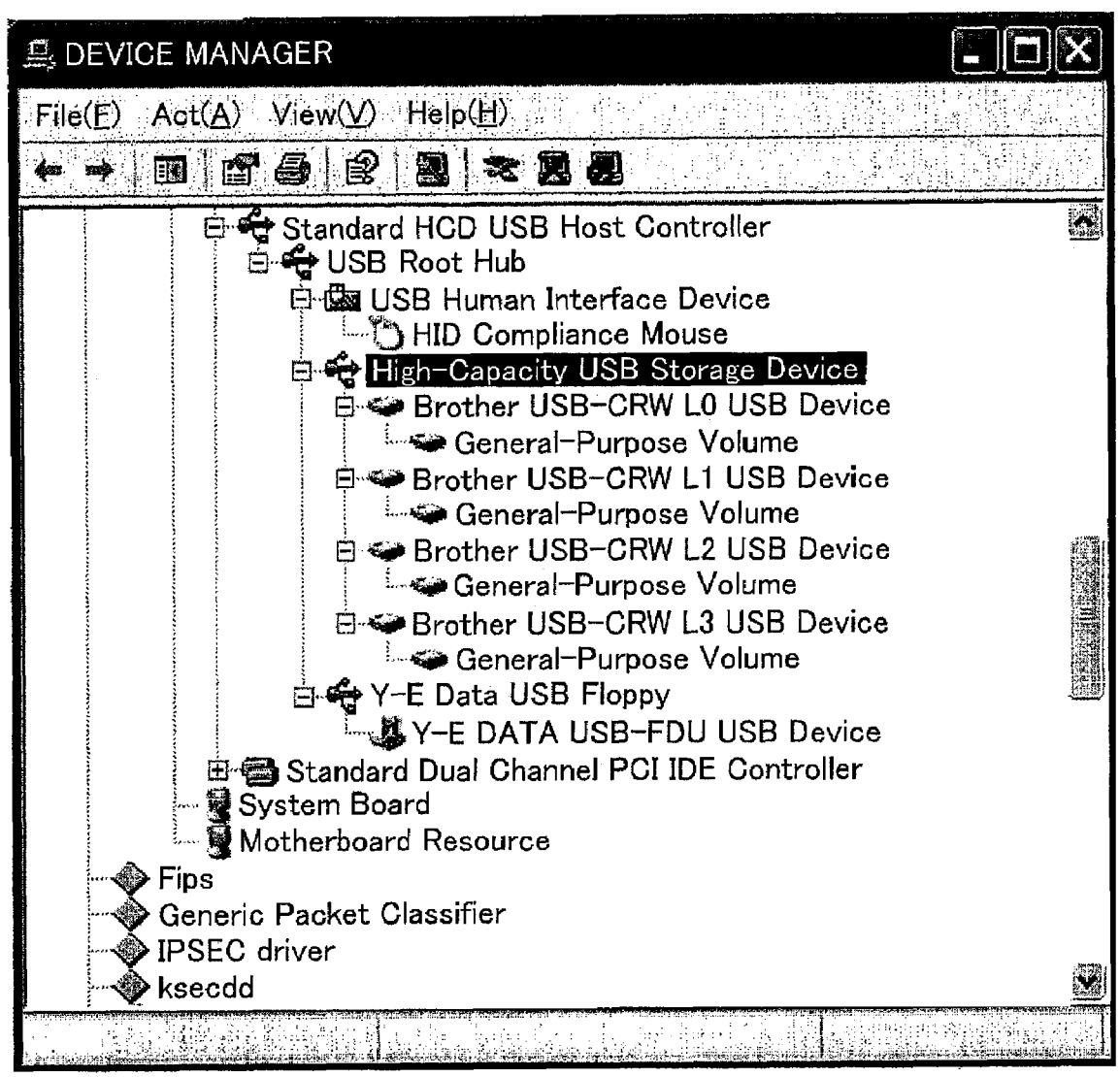
FIG. 12 is a screenshot on the host device side showing how the conventional storage controller is recognized.
Figure 14:
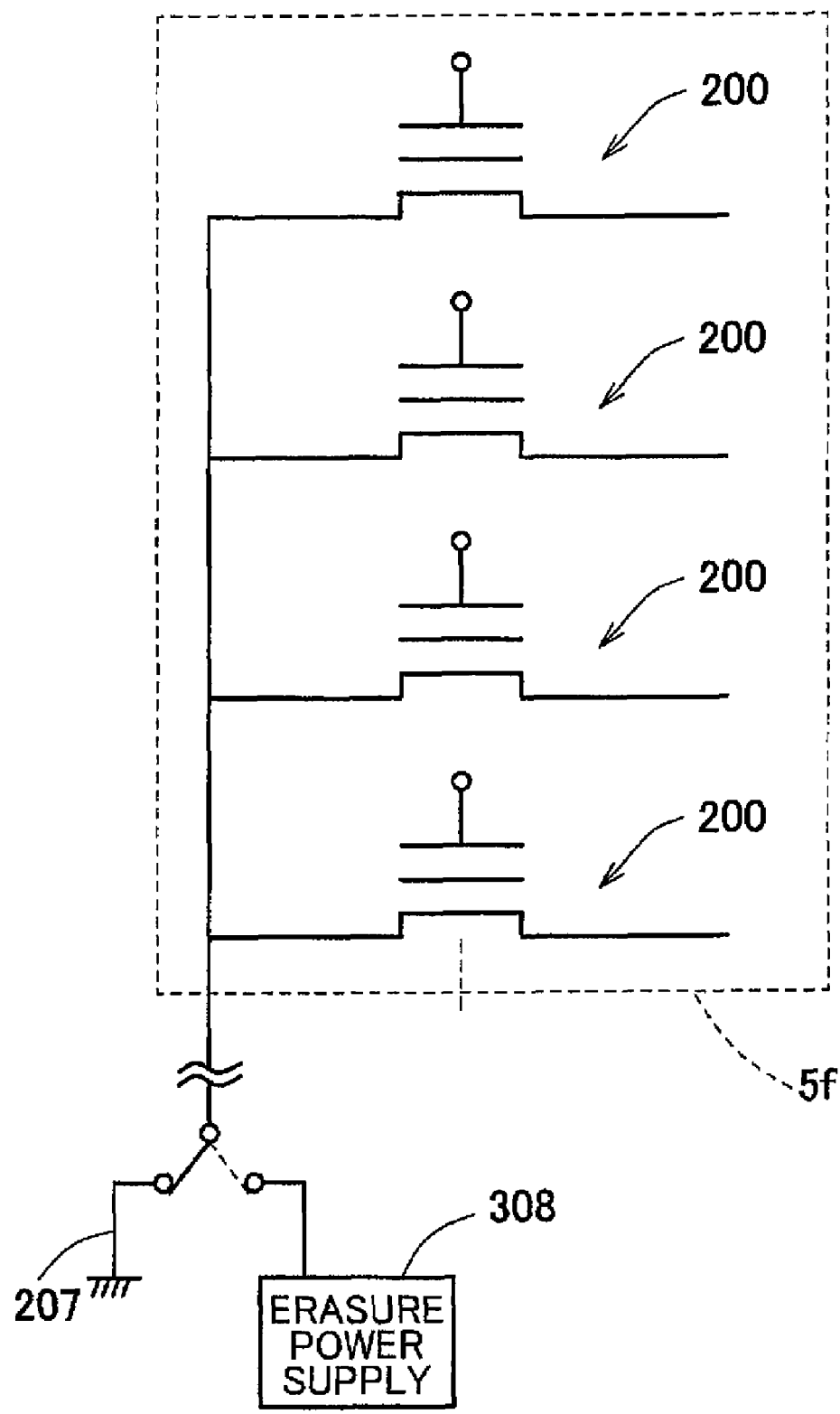
FIG. 14 is an explanatory diagram illustrating the structure of a memory block.

As shown in FIG. 8, the personal computer recognizes the storage controller 1A as a "USB composite device" and the external memory input/output controllers 51-54 listed under the USB composite device as a plurality of "High-capacity USB storage devices." In contrast, the personal computer recognizes the conventional storage controller (see FIG. 10) simply as a "High-capacity USB storage device," as shown in FIG. 12.

Second Embodiment

Next, a storage controller 1B according to a second embodiment of the present invention will be described, wherein like parts and components are designated with the same reference numerals to avoid duplicating description.

Figure 2:
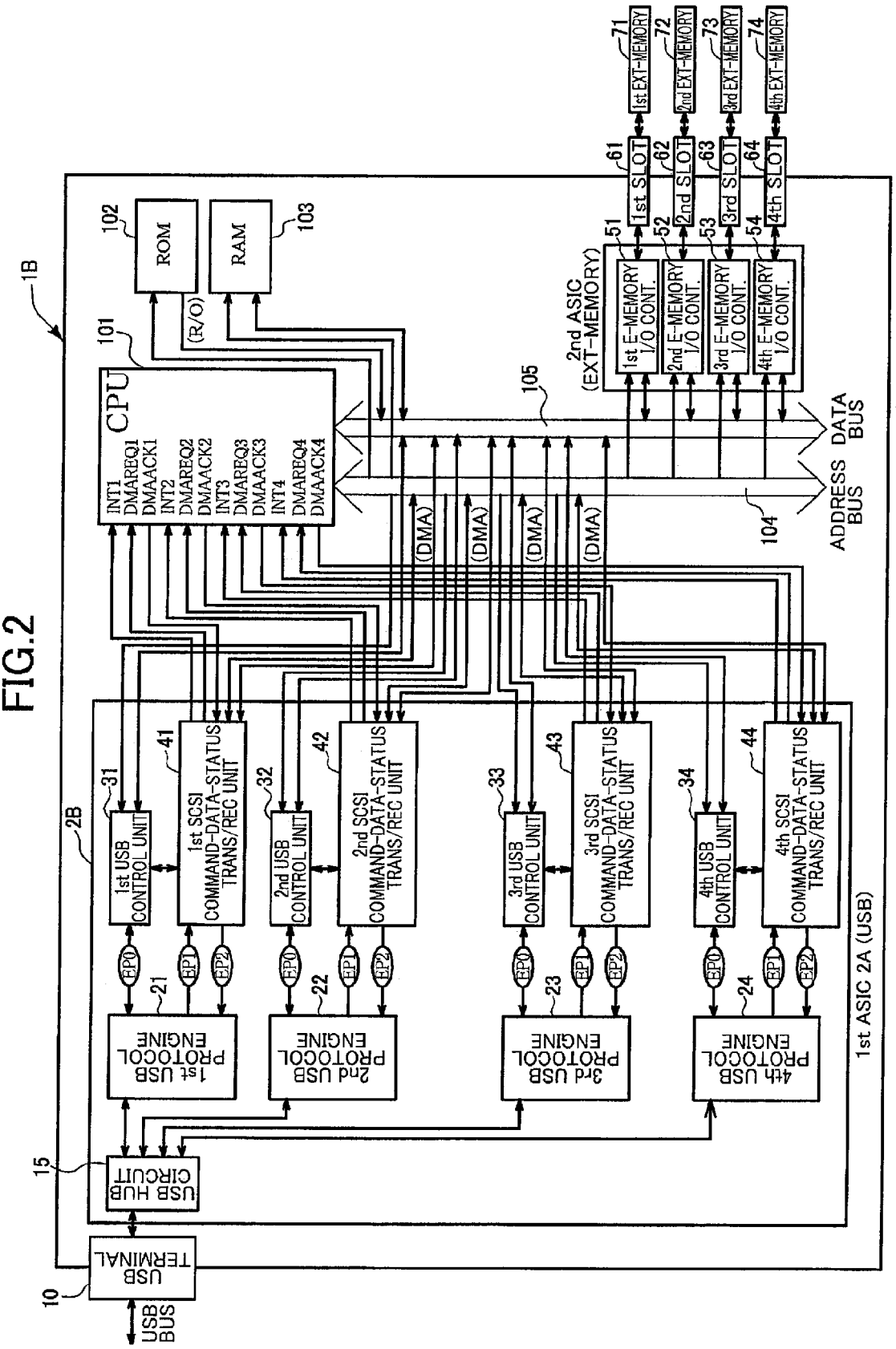
FIG. 2 is a block diagram showing the electrical structure of a storage controller according to a second embodiment.

FIG. 2 is a block diagram showing the electrical structure of the storage controller 1B according to the second embodiment. The storage controller 1B has a first ASIC (USB system) 2B that differs from the first ASIC 2A according to the first embodiment. The first ASIC 2B is provided with a plurality of independent communication control units, including USB protocol engines 21-24 and USB control units 31-34 configured in sets that correspond to the plurality of transmission/reception units 41-44. The USB protocol engines 21-24 are each connected to a corresponding transmission/reception unit 41-44 via a set of an input endpoint and an output endpoint, and are collectively connected to the single USB terminal 10 via a USB hub circuit 15.

The USB protocol engines 21-24 have the same function as the USB protocol engine 20 according to the first embodiment, while the USB control units 31-34 have the same function as the USB protocol unit 30 according to the first embodiment. With this construction, the USB hub circuit 15 routes the transfer elements, including the SCSI command, SCSI data, and SCSI status, to the USB protocol engine 21-24 belonging to the targeted transmission/reception unit 41-44 based on identification data for the USB protocol engine 21-24. Transfer elements distributed to the USB protocol engine 21-24 are transferred to the corresponding transmission/reception unit 41-44.

As with the storage controller 1A according to the first embodiment described above, the storage controller 1B also includes the plurality of transmission/reception units 41-44, and the CPU 101 capable of performing processes independently for the external memory input/output controllers 51-54. Accordingly, as shown in FIG. 7, the storage controller 1B can transfer the transfer elements associated with a control step unit for one of the slots 61-64 and the transfer elements associated with a control step unit for a different slot 61-64 in a mixed chronological order. Hence, the storage controller 1B allows a personal computer to rapidly access data in the external memory units 71-74 inserted in the slots 61-64.

Figure 9:
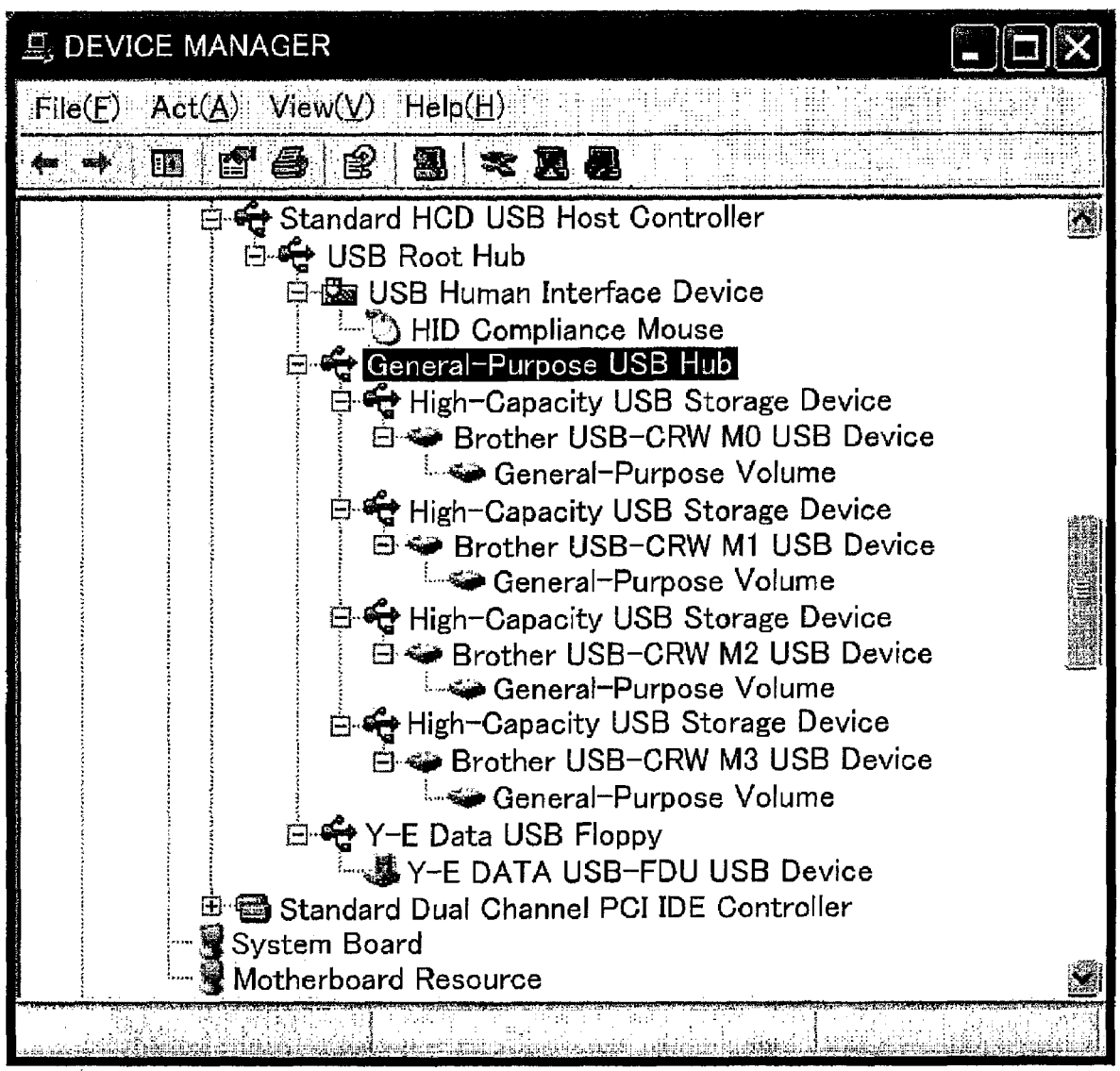
FIG. 9 is a screenshot on the host device side showing how the storage controller according to the second embodiment is recognized.

As shown in FIG. 9, the personal computer recognizes the storage controller 1B described above as a "Universal USB hub" and recognizes the external memory input/output controllers 51-54 as a plurality of "High-capacity USB storage devices" located under the Universal USB hub.

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. A storage controller comprising:
   a plurality of storage devices, each storage device having a storage medium, data stored in the storage medium being capable of accessing by a host device;
   a plurality of access control devices operatively provided for respective ones of the plurality of storage devices individually, each access control device functioning
      (1) to control data accesses to a storage device by control step units, each control step unit sequentially executing a primary control command analyzing step for receiving from the host device and analyzing a primary control command specifying content of the data access, a data access step for performing a data access with the storage device corresponding to the analyzed content of the primary control command, and a status transmitting step for transmitting to the host device a status indicating results of the data access, and
      (2) to queue execution of a control step unit for a chronologically succeeding data access while a control step unit for a preceding data access is being executed until execution of a current control step unit has completed; and
   a serial communication unit that performs access-related data transfers between the host device and the access control device specified by the host device in order to execute the control step units, the access-related data including at least the primary control command and the status as transfer elements, using serial communications according to a format of polling the plurality of access control devices, and that performs a process to transfer a set of transfer elements including the access-related data for control step units targeting different access control devices according to a format that allows the transfer elements in the set to be mixed chronologically.

2. The storage controller according to claim 1, wherein the storage medium, which the host device can write data to and read or erase data from, is detachably mounted in each of the plurality of storage devices, configured of a nonvolatile memory capable of storing electrically rewritable storage content and preserving the storage content, even when an external reset signal is received, and has a storage area that is divided into a plurality of rewritable unit blocks, whereby the storage content of the storage medium can be erased and rewritten only in units of rewritable unit blocks.

3. The storage controller according to claim 1, wherein each of the plurality of access control devices comprises a transfer element transmission/reception unit that exchanges the transfer elements with the serial communication unit, and a primary control implementation body that interrupts the primary control command included in the transfer elements and performs a data access on the storage device based on the content of the primary control command, wherein a plurality of the transfer element transmission/reception units is provided in a one-to-one correspondence to the plurality of storage devices, the primary control implementation body placing transmission and reception of the transfer elements constituting the access-related data on standby for a succeeding control step unit until a series of transfer elements constituting the access-related data for a preceding control step unit has been transferred when the transfer elements are exchanged with the transfer element transmission/reception unit corresponding to the same storage device, and wherein the primary control implementation body uses intervals between processes for transmitting and receiving transfer elements associated with a control step unit for one storage device to perform transmission and reception processes for transfer elements belonging to another control step unit when the transfer elements are exchanged with transfer element transmission/reception units corresponding to different storage devices, thereby enabling parallel processing when executing control step units for different storage devices.

4. The storage controller according to claim 3, wherein a single primary control implementation body is shared by a plurality of the transfer element transmission/reception units.

5. The storage controller according to claim 3, wherein the plurality of transfer element transmission/reception units and the serial communication unit are integrated in a special integrated circuit.

6. The storage controller according to claim 3, wherein the serial communication unit comprises a communication bus connection terminal for connecting to a serial communication bus from the host device, and a communication control unit for executing processes to exchange the transfer elements between the serial communication bus and the transfer element transmission/reception units, wherein the communication control unit comprises a communication protocol engine connected to the communication bus connection terminal, and a control command unit connected to the protocol engine via bi-directional control endpoints configured of a FIFO memory for controlling the communication processes, wherein the plurality of transfer element transmission/reception units is connected to the protocol engine via an input endpoint and an output endpoint configured of the FIFO memory for separating the input and output paths, and wherein the communication control unit identifies the storage device targeted for data access and the direction of data transmission and reception by receiving identification data from the host device identifying the transfer element transmission/reception unit targeted for data access and the endpoint corresponding to the transfer element transmission/reception unit and by polling the transfer element transmission/reception unit as the target device.

7. The storage controller according to claim 6, wherein the plurality of transfer element transmission/reception units is configured to share a single communication controller and connected in parallel to a single protocol engine of the communication controller through independent sets of input and output endpoints.

8. The storage controller according to claim 6, wherein a plurality of independent communication control units is provided corresponding to the plurality of transfer element transmission/reception units, each transfer element transmission/reception unit being connected to a corresponding communication control unit via a set of input and output endpoints, while the protocol engine of each communication control unit is collectively connected to a single communication bus connection terminal via a hub circuit.

* * * * *